United States Patent [19]

Dugrenier

[11] 4,286,349

[45] Sep. 1, 1981

[54] BROILER GRILL CLEANING BRUSH

[76] Inventor: Ernest Dugrenier, Box 2755, Road 124, West Sacramento, Calif. 95691

[21] Appl. No.: 90,010

[22] Filed: Oct. 31, 1979

[51] Int. Cl.³ .............................................. A46B 15/00
[52] U.S. Cl. ....................................... 15/111; 15/200; 15/236 R; 15/DIG. 5; 15/DIG. 6
[58] Field of Search ............. 15/111, 197, 200, 159 A, 15/160, 236 R, DIG. 5, DIG. 6

[56] References Cited

U.S. PATENT DOCUMENTS

| 638,305 | 12/1899 | Wightman | 15/111 X |
|---|---|---|---|
| 876,344 | 1/1908 | Glas | 15/5 |
| 1,878,323 | 9/1932 | Quist | 15/197 |
| 2,536,942 | 1/1951 | Kanter | 15/111 |
| 2,580,814 | 1/1952 | Morley | 15/145 X |
| 2,857,608 | 10/1958 | Schwartz | 15/236 X |
| 2,883,689 | 4/1959 | Vosbikian et al. | 15/145 X |

Primary Examiner—Edward L. Roberts

[57] ABSTRACT

This brush provides a quick and easy way of cleaning a broiler grill, and it consists primarily of a block, having a multiple number of bristle clusters, which are spaced apart from a center row of steel pegs. It further incudes a removable handle, that clamps onto the block.

3 Claims, 4 Drawing Figures

BROILER GRILL CLEANING BRUSH

This invention relates to kitchen tools, and more particularly to a broiler grill cleaning brush.

It is, therefore, the principal object of this invention to provide a broiler grill cleaning brush, which will be far superior to the plain wire brushes of the prior art, that are used in restaurants, due to this design being such, that one may clean the sides of the grate at the same time as when cleaning the top.

Another object of this invention is to provide a broiler grill cleaning brush, which will cut down the time in cleaning a broiler grill, substantially.

A further object of this invention is to provide a broiler cleaning brush, which is easier to use than the plain wire brush with a flange on it, and this tool, being easier to use, will be used more often and will serve to keep a grill more sanitary.

Other objects are to provide a broiler cleaning brush, which is simple in design, inexpensive to manufacture, rugged in construction, easy to use, and efficient in operation.

These, and other objects, will be readily evident, upon a study of the following specification, and the accompanying drawing, wherein.

Figure 2:
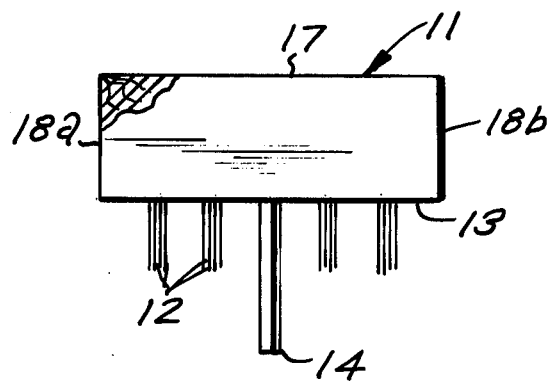
FIG. 2 is enlarged fragmentary end view of FIG. 1, shown in elevation and partly broken away.

According to this invention, a brush 10 is shown to include a rectangular configurated wooden block 11, having a plurality of clusters of wire bristles 12, spaced-apart and embedded within block 11, and extending from the bottom surface 13. A plurality of equally spaced-apart steel pegs 14 also extend from, and are embedded in the block 11. Pegs 14 are longer than bristles 12, and are arranged in a longitudinal line, in the center of the bottom surface 13, as is more readily seen in FIG. 2 of the drawing.

A handle 15, of metal, includes a top member 16, of "U"-shaped channel configuration, which is positioned over the top surface 17 of block 11, and is terminated, at one end, by a flanged portion 18, that engages a side edge 18a and the bottom surface 13 of block 11. A bottom member 19, of similar channel configuration, is secured to top member 16, by means of suitable bolt fasteners 20, and a flanged portion 21, of member 19, engages with side edge 18b and bottom surface 13 of block 11, and thus, the combination of members 16 and 19 form removable handle-grip means for brush 10.

Figure 1:
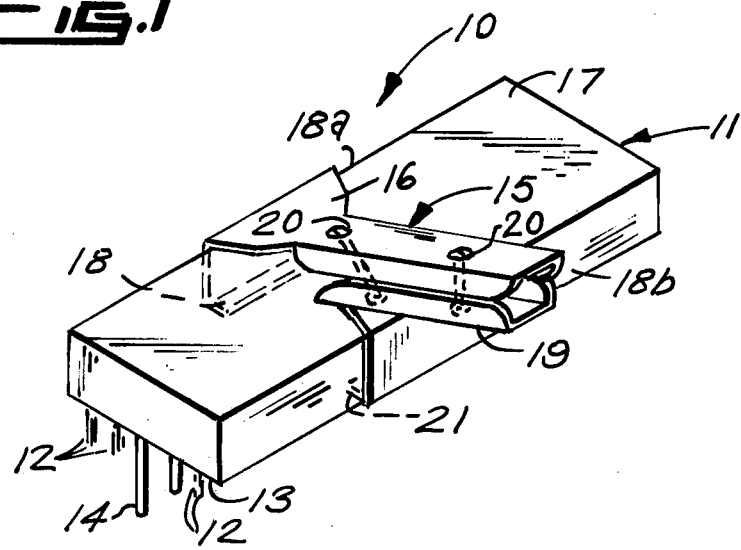
FIG. 1 is a perspective view of the present invention.

As shown in FIG. 1, the bolt fasteners 20 are angularly inclined respective to each other.

Figure 3:
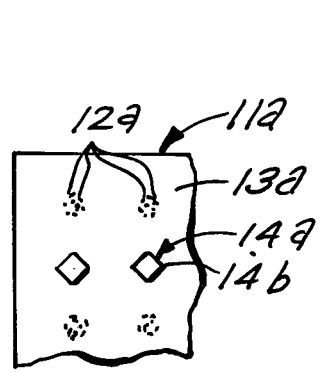
FIG. 3 is a fragmentary bottom plan view of a modified form of the invention, showing square shaped pins spaced between wire bristles.

Referring now to FIG. 3, a modified form of brush 22 is shown to include a block 11a, having bristles 12a extending from bottom surface 13a, and pegs 14a are square in cross-sectional configuration, thus having sharp edges 14b for cleaning purposes. All of the pegs are each mounted in a diamond-shaped position on the block, as shown.

Figure 4:
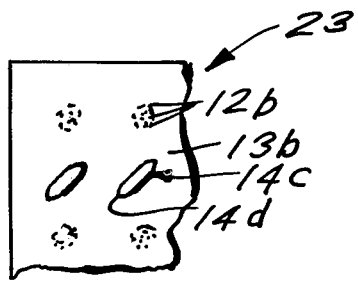
FIG. 4 is similar to FIG. 3, but shows blade-shaped pins.

Referring now to FIG. 4, another modified form 23 is shown to include bristles 12b, extending from surface 13b, and pegs 14c are of blade-like configuration, having sharp edges 14d, that are oppositely opposed to each other for cleaning purposes. All of the pegs are mounted on the block with the generally flat plane of their blade-like configuration at the same diagonally inclined angle, as shown.

It is now evident that, in operative use, while a top surface of a grill is brushed by the bristles, the row of pegs scrape a side edge of the grill.

While various changes may be made in the detail construction, it is understood that such changes will be within the spirit and scope of the present invention, as is defined by the appended claims.

What I now claim is:

1. A broiler grill cleaning brush, comprising, in combination, a rectangular wooden block, a plurality of brush wire bristle clusters and a plurality of steel pegs embedded in said block, and protruding from the bottom side thereof; said pegs being in a straight row along a longitudinal center of said block, while said bristle clusters are on each opposite side portion of said block bottom side, separated by said peg row, and said pegs protruding further than said bristle clusters from said block.

2. The combination as set forth in claim 1, wherein said pegs are cross-sectionally configurated, with at least one pair of longitudinal sharp edges on opposite sides thereof, and said sharp edges of all said pegs extend sidewardly, so as to form a scraping means, when said row of pegs are scraped along a side edge of said grill.

3. The combination as set forth in claim 2, wherein a handle, secured to said block, comprises two elongated members, each of which includes a clamping jaw at one end, for clamping said block between said members, and opposite extending ends of said members being secured together by a pair of bolt fasteners, angularly inclined respective to each other.

* * * * *